United States Patent
Tsujimura (10) Patent No.: US 8,593,292 B2
(45) Date of Patent: Nov. 26, 2013

(54) HOUSEHOLD ELECTRICAL APPLIANCE

(75) Inventor: Satoshi Tsujimura, Hyogo (JP)

(73) Assignee: Panasonic Corporation, Osaka (JP)

( * ) Notice: Subject to any disclaimer, the term of this patent is extended or adjusted under 35 U.S.C. 154(b) by 25 days.

(21) Appl. No.: 13/518,522

(22) PCT Filed: Dec. 24, 2010

(86) PCT No.: PCT/JP2010/007500
§ 371 (c)(1),
(2), (4) Date: Jun. 22, 2012

(87) PCT Pub. No.: WO2011/077745
PCT Pub. Date: Jun. 30, 2011

(65) Prior Publication Data
US 2012/0256755 A1   Oct. 11, 2012

(30) Foreign Application Priority Data
Dec. 25, 2009   (JP) .................................. 2009-295146

(51) Int. Cl.
*G08B 21/00* (2006.01)
*G05D 17/00* (2006.01)

(52) U.S. Cl.
USPC ........................... 340/657; 340/635; 700/297

(58) Field of Classification Search
USPC .............. 340/657–664, 635, 637, 693.3, 540, 340/584, 3.1, 3.3, 3.31; 702/57, 60–65; 700/286, 295–297, 300, 90; 324/103 R, 324/110, 76.17; 307/64, 118, 112, 125; 323/318; 713/340; 315/131
See application file for complete search history.

(56) References Cited

U.S. PATENT DOCUMENTS 6,853,291 B1 *  2/2005  Aisa ................................ 340/3.3
7,693,590 B2 *  4/2010  Nelson ............................. 700/80
2006/0155395 A1 *  7/2006  Lim ................................. 700/22
2009/0045804 A1   2/2009  Durling et al.
2010/0141463 A1 *  6/2010  Schweitzer, III ............. 340/658

FOREIGN PATENT DOCUMENTS

| JP | 3048420 U | 5/1998 |
|----|-----------|--------|
| JP | 11-118844 A | 4/1999 |
| JP | 11-257717 A | 9/1999 |
| JP | 2005-249358 A | 9/2005 |
| JP | 2007-033120 A | 2/2007 |
| JP | 2009-047694 A | 3/2009 |

OTHER PUBLICATIONS

International Search Report for International Application No. PCT/JP2010/007500, dated Mar. 29, 2011, 1 page.

* cited by examiner

*Primary Examiner* — Anh V La
(74) *Attorney, Agent, or Firm* — Brinks Gilson & Lione (57) ABSTRACT

Herein disclosed is a household electrical appliance easily to know whether electricity rates are high or low when using the household electrical appliance, even in the variable rate system. The household electrical appliance includes, a receiving unit that receives information of electricity rates which are changed based on power generation capacity and power consumption amount and charged for power consumption as instantaneous electricity rate information; an electricity rate information accumulating unit that accumulates the received instantaneous electricity rate information; a determination unit that outputs a result obtained by statistically calculating a plurality of the accumulated instantaneous electricity rate information items as reference electricity rate information, and compares the latest received instantaneous electricity rate information with the output reference electricity rate information; and a numerical value display unit that notifies whether the latest instantaneous electricity rate information is higher than the reference electricity rate information.

11 Claims, 4 Drawing Sheets

FIG. 4 US 8,593,292 B2.

HOUSEHOLD ELECTRICAL APPLIANCE

This application is a 371 application of PCT/JP2010/007500 having an international filing date of Dec. 24, 2010, which claims priority to JP 2009-295146 filed Dec. 25, 2009, the entire contents of which are incorporated herein by reference.

TECHNICAL FIELD

The present invention relates to a household electrical appliance, and more particularly to a household electrical appliance for which use by connection to a future electrical grid system called a "smart grid" is assumed (household electrical appliance mainly used in a general household).

BACKGROUND ART

A smart grid is a concept to solve a problem of power transmission between a supplier and a consumer actively using information technology, and has a purpose of constructing an intelligent transmission network without wasting energy and with minimal costs.

As a specific system using the smart grid, for example, a smart meter has been suggested. The smart meter is a system including a high functionality electric meter with a communication function and a function of managing other appliances. When the smart meter system is used, communication or control can be performed through an electric meter which is installed as a part of the equipment of a power consumer. For example, the smart system can notify the measurement result of power consumption amount spent by the power consumer to a power supplier using a communication function built into the electric meter. For this reason, the power supplier may omit the operation of reading the electric meter for charging the electricity usage rates.

On the other hand, when the power supplier provides solar cell equipment or wind power generation equipment as power generation equipment, for example, the electric generation capacity is not constant and is changed moment by moment as environmental conditions such as weather, wind force and wind direction change. For example, even when the power consumption amount is constant, in a case where the power generation capacity is insufficient due to a decrease in the power generation capacity, it is necessary to use thermal power generation or other power generation equipment to make up for the insufficient power and power generation costs may change remarkably according to fuel consumption.

As an application of the smart grid, a variable rate system of electricity rates (real time pricing) has been under review. In other words, the electricity rates per unit power consumption amount of each consumer are changed to the optimal rates based on the relation between the power generation capacity and power consumption amount. The electricity rates are changed such that when the power consumption amount is relatively high, the electricity rates are high, and when the power consumption amount is relatively low, the electricity rates are low. In this case, the power supplier can ascertain the power consumption amount of the consumer in each place using the smart meter, determines the electricity rates per unit power consumption amount as the optimal rates sequentially based on the relation between the power generation capacity and the power consumption amount, and notifies the latest electricity rates to the consumer of each location using the smart meter in real time.

As the related art of the invention, for example, the technologies which are disclosed in PTL 1, PTL 2, PTL 3, and PTL 4 are known.

In PTL 1, it is suggested that timer means be provided to identify a time slot division to which the present time belongs to display a unit price of electricity rates predetermined in every time slot on an indoor display device.

In PTL 2, it is suggested that a power strip have a power consumption measurement function and calculate the electricity rates per hour and the accumulated electricity rates based on the measured power consumption and the unit price of electricity rates to display the result. The unit price of the electricity rates used in the calculation can be changed and a warning display may be shown when the power consumption is more than a predetermined value.

In PTL 3, it is suggested that an air conditioner have a function of measuring power consumption, calculate electricity rates for a predetermined period (a day's worth) during operation based on the measured power consumption, and warn a user of the electricity rates by flashing a display unit when the electricity rates become close to a predetermined value.

In PTL 4, technology is suggested that an electricity meter to which various electrical appliances are connected have a special algorithm process function which analyzes a detected voltage or current consumption and separate power consumption amount of each electrical appliance from the total power consumption amount to display the power consumption amount.

CITATION LIST

Patent Literature

[PTL 1] JP-A-2007-33120
[PTL 2] Japanese Utility Model Registration No. 3048420
[PTL 3] JP-A-11-257717
[PTL 4] JP-A-2009-47694

SUMMARY OF INVENTION

Technical Problem

Changing electricity rates per unit power consumption amount according to time slots has been performed up to now exemplified by an electricity rates for midnight power. That is, the midnight electricity rates become lower than the daytime electricity rates to use surplus power effectively in the midnight time slot when power demand is low. However, predetermined electricity rates of midnight power are applied to each unit power consumption amount.

Meanwhile, when a variable rate system of electricity rates is introduced using a smart grid, the electricity rates per unit power consumption amount (kWh) according to power generation capacity and power consumption amount change frequently. Moreover, the electricity rates are not a predetermined value. If the weather is clear, photovoltaic generation capacity becomes large and the electricity rates become low even in the daytime. If it is a windy day, wind power generation capacity becomes large and the electricity rates become low. Thus the electricity rates change irregularly. It is necessary for a consumer using a household electrical appliance to know and receive information of the latest electricity rates (the electricity rates per unit power consumption amount) determined by a power supplier through the smart meter to ascertain the electricity rates practically applied to the present power usage.

For example, using the related art in PTL 1, the indoor display device can display the unit price of electricity rates predetermined in every time slot. However, when the electricity rates change irregularly irrespective of the time slot division, the actual electricity rates cannot be displayed. Even when the information of the latest electricity rates using the smart meter can be displayed, it is not easy for the consumer in the home to determine whether the displayed electricity rates are high or low. Moreover, the smart meter displaying the electricity rates is disposed at a position distant from the place where each household electrical appliance is installed such as a portion of a panel board outside or inside the house and the consumer in the home should move to the place distant from the household electrical appliance and check the displayed contents of the smart meter to ascertain the actual electricity rates before the consumer uses each household electrical appliance.

It is necessary for each consumer to purposefully operate the household electrical appliance such that power consumption is avoided as far as possible in the time slot with the high electricity rates, and makes the household electrical appliance operate at the time slot with the low electricity rates, to use available power efficiently and suppress discharge of carbon dioxide. However, it is difficult for each consumer to ascertain whether the present electricity rates are high or low in case the electricity rates of each time point change irregularly without using an electricity rate system predetermined in every time slot like midnight power.

The invention has been made in order to solve the problems as mentioned above and has an object to provide a household electrical appliance easily to know whether electricity rates are high or low at the time of using the household electrical appliance, even in the variable rate system in which the electricity rates change.

Solution to Problem

A household electrical appliance of the present invention includes: an instantaneous electricity rate information receiving unit that receives information of electricity rates which are changed based on power generation capacity and power consumption amount and charged for power consumption as instantaneous electricity rate information; an instantaneous electricity rate information accumulating unit that accumulates the instantaneous electricity rate information received by the instantaneous electricity rate information receiving unit; a reference electricity rate information calculating unit that outputs a result obtained by statistically calculating a plurality of the instantaneous electricity rate information items accumulated by the instantaneous electricity rate information accumulating unit as reference electricity rate information; an electricity rate comparing unit that compares the latest instantaneous electricity rate information received by the instantaneous electricity rate information receiving unit with the reference electricity rate information output from the reference electricity rate calculating unit; and a notification unit that notifies whether the latest instantaneous electricity rate information is higher than the reference electricity rate information, in accordance with the comparison result of the electricity rate comparing unit.

According to the household electrical appliance, a consumer can easily determine whether the present electricity rates are high or low based on the notification information output from the notification unit. Thus, the consumer can determine whether to operate the household electrical appliance at this time according to the result, use power efficiently and suppress discharge of carbon dioxide. In other words, when the instantaneous electricity rate information is higher than the reference electricity rate information, the electricity rates are relatively high, that is, the consumer can recognize that discharge of carbon dioxide is high, stop operating the household electrical appliance and wait until the electricity rates become low.

Moreover, in the household electrical appliance of the present invention, the reference electricity rate information calculating unit calculates mean of the plurality of instantaneous electricity rate information items received during a predetermined period in the past as the reference electricity rate information.

According to the household electrical appliance, even when a range in which the instantaneous electricity rates change is not constant, as a reference value to distinguish whether the electricity rates are relatively high or not, the reference electricity rate information can be determined properly.

Further, in the household electrical appliance of the present invention, the reference electricity rate information calculating unit calculates the mean of the plurality of the instantaneous electricity rate information received previous day as the reference electricity rate information.

According to the household electrical appliance, even when a range in which the instantaneous electricity rates change is not constant, based on the electricity rates of power consumption of the previous day, the reference value can be determined properly to distinguish whether the electricity rates are relatively high or not.

Further, in the household electrical appliance of the present invention, the reference electricity rate information calculating unit calculates the mean of the plurality of instantaneous electricity rate information items received within the last 24 hours as the reference electricity rate information.

According to the household electrical appliance, even when a range in which the instantaneous electricity rates change is not constant, based on the electricity rates of power consumption of last 24 hours, a threshold value can be properly determined to distinguish whether the electricity rates are relatively high or not. A memory capacity that the instantaneous electricity rate information accumulating unit requires can be reduced.

A household electrical appliance of the present invention includes: an instantaneous electricity rate information receiving unit that receives information of electricity rates which are changed based on power generation capacity and power consumption amount and charged for power consumption as instantaneous electricity rate information; an input unit to input information; an electricity rate comparing unit that compares the instantaneous electricity rate information received by the instantaneous electricity rate information receiving unit with threshold value electricity rate information input from the input unit; and a notification unit that notifies whether the instantaneous electricity rate information is higher than the threshold value electricity rate information, in accordance with the comparison result of the electricity rate comparing unit.

According to the household electrical appliance, the consumer can easily determine whether the present electricity rates are high or low based on the notification information output from the notification unit. Thus, the consumer can determine whether to operate the household electrical appliance at this time according to the result, use power efficiently and suppress the discharge of carbon dioxide. In other words, when instantaneous electricity rate information is higher than the threshold value electricity rate information, the electricity rates are relatively high, that is, the consumer can recognize that discharge of carbon dioxide is high, stop operating the household electrical appliance and wait until the electricity rates become low.

Moreover, in the household electrical appliance of the present invention, the notification unit lights up an LED lamp for notification.

According to the household electrical appliance, the consumer can easily determine whether the present electricity rates are high or low from the display state of the LED lamp.

Further, in the household electrical appliance of the present invention, the notification unit displays the instantaneous electricity rate information and changes a background color of the instantaneous electricity rate information for notification.

According to the household electrical appliance, for example, the consumer can easily determine whether the present electricity rates are high or low by a color division used as a background color of numerical value in the displayed instantaneous electricity rate information.

Further, in the household electrical appliance of the present invention, the notification unit outputs warning sound for notification when the power is applied to the household electrical appliance.

According to the household electrical appliance, for instance, the consumer can easily determine whether the present electricity rates are high or low based on the presence or kinds of the output warning sound.

Advantageous Effects of Invention

The household electrical appliance of the present invention, makes it possible to easily know whether electricity rates are high or low at the time of using the household electrical appliance, even in the variable rate system in which the electricity rates change.

DESCRIPTION OF EMBODIMENTS

Hereinafter, a household electrical appliance according to an embodiment of the invention will be described with reference to the drawings.

Figure 1:
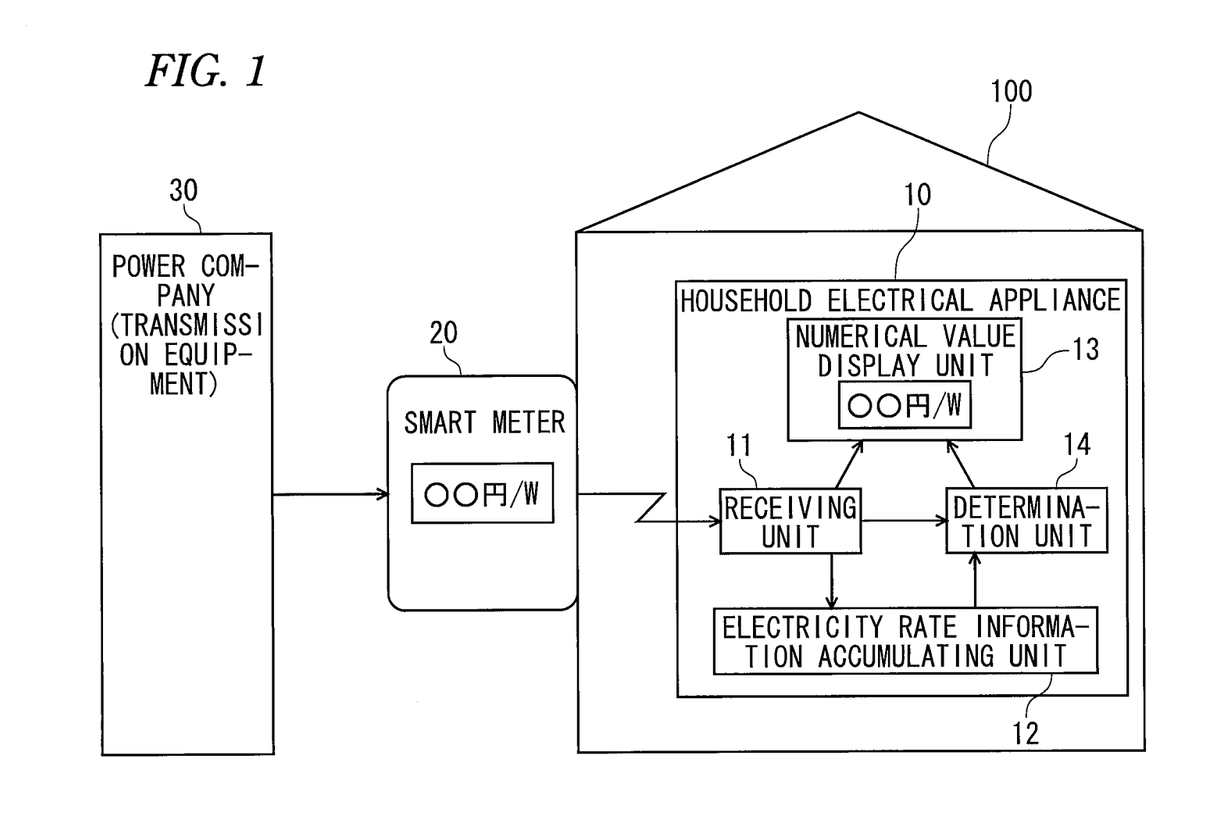
FIG. 1 is a block diagram showing a configuration example of a system including a household electrical appliance according to an embodiment.
Figure 2:
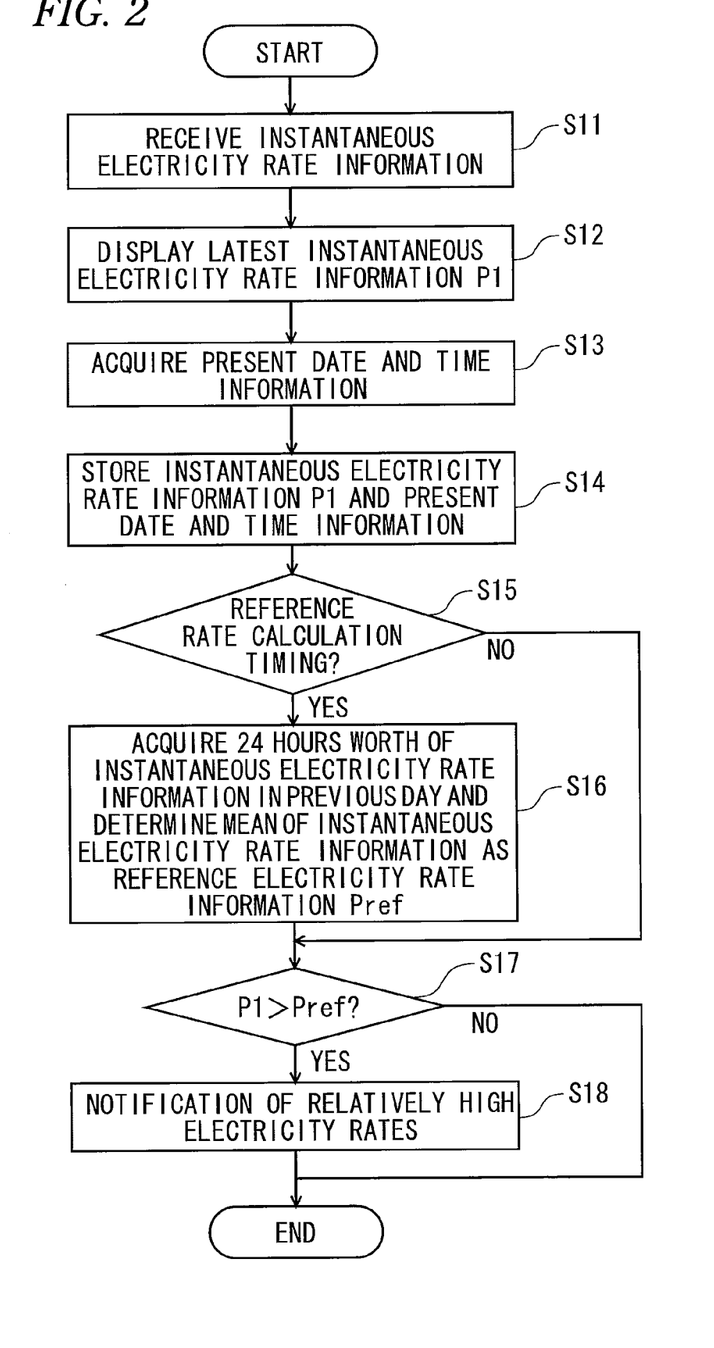
FIG. 2 is a flowchart showing a main operation of the household electrical appliance in FIG. 1.

FIG. 1 shows a configuration example of a system including a household electrical appliance according to an embodiment of the invention. FIG. 2 also shows a main operation of the household electrical appliance 10 in FIG. 1. As representative examples of the household electrical appliance 10 in FIG. 1, devices such as an air conditioner, a microwave oven, a washing machine, and a vacuum cleaner that a consumer can put in an operating state by turning a power switch ON or OFF, if necessary, can be assumed. In addition to turning the power switch ON or OFF, a device in which the power consumption amount changes remarkably according to a preset temperature like an air conditioner and various devices which come with an energy-saving mode and the power consumption amount changes remarkably by turning the mode ON or OFF, are assumed as a household electrical appliance 10.

The household electrical appliance 10 is arranged in a house 100 as shown in FIG. 1. A smart meter 20 is installed on an outside wall of the house 100. The smart meter 20 has a function of an electric meter used to measure the overall power consumption amount in the home and a communication function.

Commercial alternating-current power is supplied to each appliance in the house 100 via the smart meter 20 from electric transmission equipment 30 of a power company. The electric transmission equipment 30 of the power company is assumed to have a function corresponding to a smart grid. Specifically, equipment using a solar cell, wind power generation equipment, thermal power generation equipment and the like are included in power generation equipment. In regard to a measured rate system of electricity rates that the power company charges for unit power consumption amount of each consumer (for example, every kWh), the generation capacity of solar cell equipment and wind power generation equipment, power consumption amount of all consumers, power consumption amount of each consumer and the like are considered and the electricity rates are sequentially determined and corrected to be optimal rates from the viewpoint of energy saving, if necessary. That is, the actual electricity rates with respect to unit power consumption change irregularly according to changes in weather conditions, wind speed, wind direction or the like.

Since the electricity rates per unit power consumption amount change irregularly, this information need to be transmitted to each consumer from a power company. The information of the latest electricity rates per unit power consumption amount actually charging for the present power consumption amount are regularly or irregularly notified to the smart meter 20 as instantaneous electricity rate information. For example, information such as "30 yen/kWh" is notified as the instantaneous electricity rate information.

As shown in FIG. 1, the household electrical appliance 10 is provided with a receiving unit 11, an electricity rate information accumulating unit 12, a numerical value display unit 13, and a determination unit 14.

The receiving unit 11 is loaded with a communication function to transmit information between the household electrical appliance 10 and the smart meter 20 and regularly or irregularly receives the instantaneous electricity rate information transmitted from the electric transmission equipment 30 of the power company through the smart meter 20.

The electricity rate information accumulating unit is a memory device like a semiconductor memory, and acquires and accumulates the instantaneous electricity rate information received by the receiving unit 11 at each time point, respectively. In regard to the memory capacity of the electricity rate information accumulating unit 12, all of the instantaneous electricity rate information for at least the past 24 hours worth (a day's worth) can be accumulated.

The numerical value display unit 13 is a display to display the latest instantaneous electricity rate information as a numerical value, for example, "30 yen/kWh". In addition, the numerical value display unit 13 is also loaded with a display function to distinguish whether the present electricity rates of the instantaneous electricity rate information are high or low. For instance, a function to change the background color of the numerical value display is included.

The determination unit 14 calculates reference electricity rate information to determine whether the present electricity rates are high or low based on the pieces of instantaneous electricity rate information accumulated in the electricity rate information accumulating unit 12, as reference. This reference electricity rate information means a result from a statistical calculation process of pieces of instantaneous electricity rate information (calculation of mean and the like), for example. The determination unit 14 compares the latest instantaneous electricity rate information received by the receiving unit 11 with the reference electricity rate information. The determination unit 14 reflects this compared result in the display contents of numerical value display unit 13 (notification information) and notifies to the consumer that the present electricity rates are high or low. A function of the determination unit 14 can be assumed to be realized by using a part of a microcomputer (not shown) function of controlling the household electrical appliance 10.

Power necessary for these operations may be supplied all the time for each function of the receiving unit 11, the electricity rate information accumulating unit 12, the numerical value display unit 13, and the determination unit 14 and keep an operable state all the time, even when the main power source of household electrical appliance 10 is in an OFF state.

Only the power necessary for the operations of the receiving unit 11 and the electricity rate information accumulating unit 12 is supplied all the time, and when the main power source of household electrical appliance 10 is in an ON state, the power is supplied to the numerical value display unit 13 and the determination unit 14 so that the consumer may be notified that the present electricity rates are high or not at the timing when main power source is ON.

When the instantaneous electricity rate information transmitted from the smart meter 20 is regularly transmitted, the power may be supplied to the receiving unit 11 and the electricity rate information accumulating unit 12 only while receiving according to the transmitting time, and the instantaneous electricity rate information is received and accumulated to reduce standby power consumption.

A main operation related to the electricity rates of the household electrical appliance 10 shown in FIG. 1 will be described with reference to FIG. 2.

In step S11, the receiving unit 11 regularly or irregularly receives the latest instantaneous electricity rate information from the smart meter 20. It may be considered that the receiving unit 11 receives the instantaneous electricity rate information regularly for example, every 10 minutes, every 30 minutes or every hour.

In step S12, the numerical value display unit 13 displays the contents of the latest instantaneous electricity rate information P1 received by the receiving unit 11 with a numerical value such as "30 yen/kWh".

In step S13, the determination unit 14 acquires time and date information (date and time information) at the time of processing step S13 from a built-in timepiece and calendar unit (not shown).

In step S14, the electricity rate information accumulating unit 12 associates the latest instantaneous electricity rate information P1 received in step S11 with the date and time information acquired in step S13 to store the associating. By performing step S14 repeatedly, the pieces of instantaneous electricity rate information and date and time information are accumulated on the electricity rate information accumulating unit 12 in time series.

In step S15, the determination unit 14 references the date and time information (the present date and time information) at the time of processing step S15 from the timepiece and calendar unit and recognizes whether the current time is predetermined reference rate calculation timing. For example, when the reference rate calculation is performed every 10 minutes, the process proceeds to step S16 whenever 10 minutes elapses.

In step S16, the determination unit 14 references the date and time information of the pieces of instantaneous electricity rate information accumulated in the electricity rate information accumulating unit 12 and acquires all of the instantaneous electricity rate information of the past 24 hours worth which belongs to day previous to the present date and time information from the electricity rate information accumulating unit 12. The determination unit 14 calculates the mean of acquired instantaneous electricity rate information and determines the result as the reference electricity rate information Pref.

A maximum value and a minimum value in the 24 hours worth of instantaneous electricity rate information of the previous day are detected and an intermediate value of the maximum value and the minimum value may be used, instead of the mean. The mean may be corrected using a predetermined constant in consideration of the unique power consumption properties of the household electrical appliance 10. Further, various kinds of known calculation formulae may be used as a calculation method of the mean.

In step S17, the determination unit 14 compares the latest (present) instantaneous electricity rate information P1 and the reference electricity rate information Pref. When the condition that the instantaneous electricity rate information P1 is bigger than the reference electricity rate information Pref (P1>Pref) is satisfied, the process proceeds to step S18.

In step S18, to specify that the present electricity rates are relatively high, the determination unit 14 outputs predetermined control information to the numerical value display unit 13. In this time, the numerical value display unit 13 changes the background color of the numerical value display according to the control information from the determination unit 14. For example, when electricity rates of power consumption in consuming are higher (relatively higher) than the reference electricity rates, the numerical value display unit 13 determines red as the background color, and when electricity rates of power consumption in consuming are not higher (relatively lower) than the reference electricity rates, the numerical value display unit 13 determines blue as the background color. The change of background color is an example of notification of the electricity rates being relatively high. This control information includes information to change the background color.

Light Emitting Diodes (LEDs) for warning may be provided in the numerical value display unit 13, lighting control with respect to an LED lamp by the control information from the determination unit 14 may be performed. For example, when electricity rates of power consumption in consuming are relatively high, lighting or blinking of the LEDs is made and when electricity rates of power consumption in consuming are relatively low, the LEDs are extinguished. In addition, the LED emission color may be changed. The lighting, blinking, extinguishing, and changing emission colors of the LEDs are examples of notification of the electricity rates being relatively high. This control information includes information for performing the lighting, blinking, extinguishing, and changing emission colors of the LEDs.

Instead of notification by the displaying the information, a sound output unit to output warning sound may be provided and controlled by the control information from the determination unit 14. When the warning sound is output, to notify the electricity rates of power consumption in consuming relatively high to the consumer effectively, it is assumed that the determination unit 14 monitors whether the main power source of household electrical appliance 10 is on or not, and the sound output unit outputs warning sound depending on the control information from the determination unit 14 near the timing of the main power source on. The output of warning sound is an example of notification of the electricity rates being relatively high. This control information includes information to output the warning sound.

On the other hand, when the instantaneous electricity rate information P1 is equal to or smaller than the reference electricity rate information Pref, the determination unit 14 clears the control information to clarify that the electricity rates of power consumption in consuming are relatively low. Due to this, the background color of the numerical value display on the numerical value display unit 13 is reset to normal color (for example, blue), the LED lamp showing the electricity rates are high is extinguished, or the warning sound output is released, for example.

Accordingly, when the consumer wants to use the household electrical appliance 10, the notification information is output on the numerical value display unit 13 as a display or warning sound so that the consumer can easily ascertain whether the electricity rates of power consumption in consuming are relatively high or low. That is, when the consumer is not in a hurry, the consumer can avoid using the household electrical appliance 10 at the time of relatively high electricity rates, wait until the electricity rates become relatively low so that the consumer does not need to pay high electricity rates and contributes to reducing the discharge of carbon dioxide. When the consumer can turn ON or OFF an energy-saving mode of the household electrical appliance 10 by an input operation, the consumer can change the energy-saving mode to ON at the time of relatively high electricity rates and select the mode such that the household electrical appliance 10 is operated in the state where power consumption is low. In case the household electrical appliance 10 is an air conditioner, the consumer can select the mode such that the air conditioner operates in the state of a setting temperature higher than the usual temperature at the time of relatively high electricity rates.

Modification 1

Figure 3:
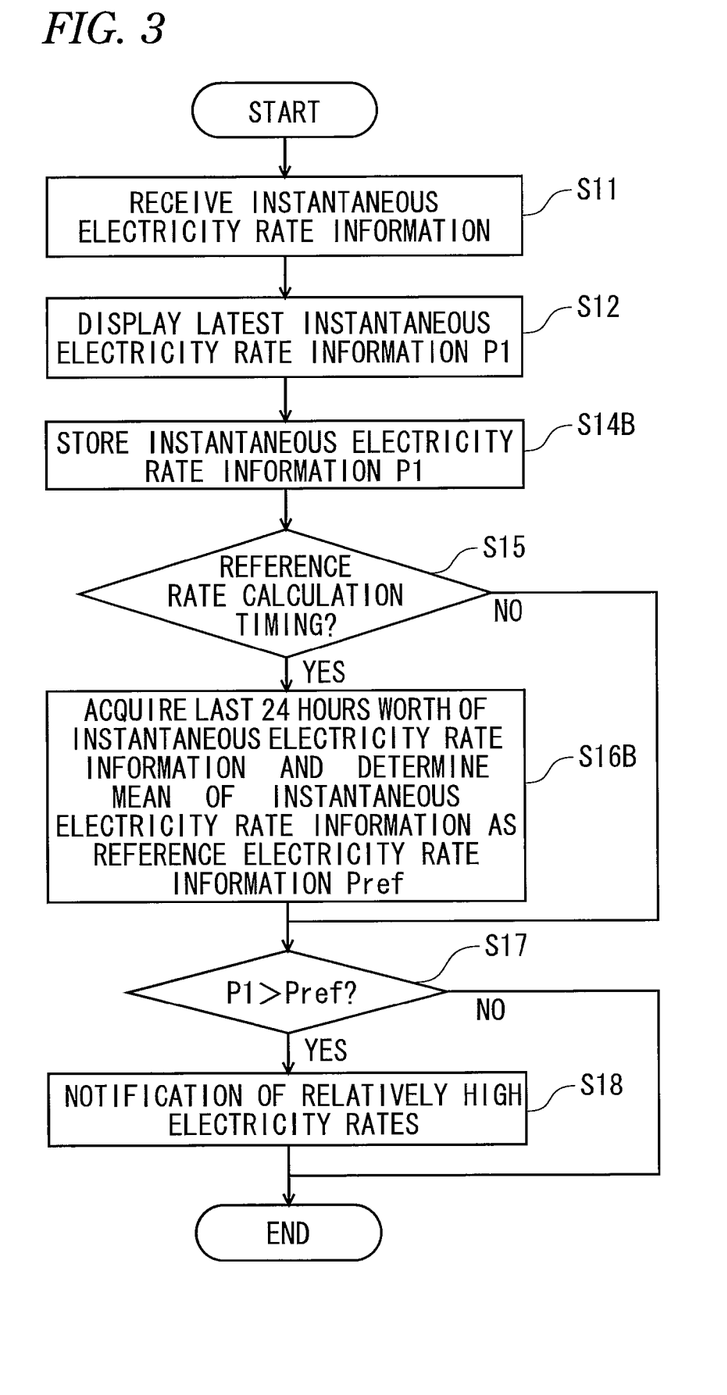
FIG. 3 is a flowchart showing a modification 1 of the operation in FIG. 2.

One modification of operation shown FIG. 2 is shown in FIG. 3. In FIG. 3, steps corresponding to each factor in FIG. 2 are donated by the same reference numerals. Only changed steps will be described below.

In step S14B, the electricity rate information accumulating unit 12 stores the latest instantaneous electricity rate information P1 received in step S11 in the order of reception of the electricity rate information accumulating unit 12 side by side. The instantaneous electricity rate information received in the past is already stored in the electricity rate information accumulating unit 12, and when the capacity is full already, the electricity rate information accumulating unit 12 discards the oldest data stored in the oldest position, moves data other than the corresponding oldest data to a position as old as a piece of data, and writes the latest instantaneous electricity rate information P1 on the latest position. Thus, when the electricity rate information accumulating unit 12 has the capacity of storing n pieces of data, n pieces of the latest instantaneous electricity rate information close to the present in reception time (for example, the past 24 hours worth) are accumulated in the electricity rate information accumulating unit 12.

In step S16B, the determination unit 14 acquires all the latest (last) instantaneous electricity rate information of 24 hours worth from the electricity rate information accumulating unit 12. The determination unit 14 calculates mean of the electricity rate information and determines the result as the reference electricity rate information Pref.

In this modification 1, since it is unnecessary that date and time information be detected and stored in the electricity rate information accumulating unit 12 and the number of data in the instantaneous electricity rate information accumulated in the electricity rate information accumulating unit 12 can be made minimal, memory capacity required by the electricity rate information accumulating unit 12 can be reduced.

Modification 2

Figure 4:
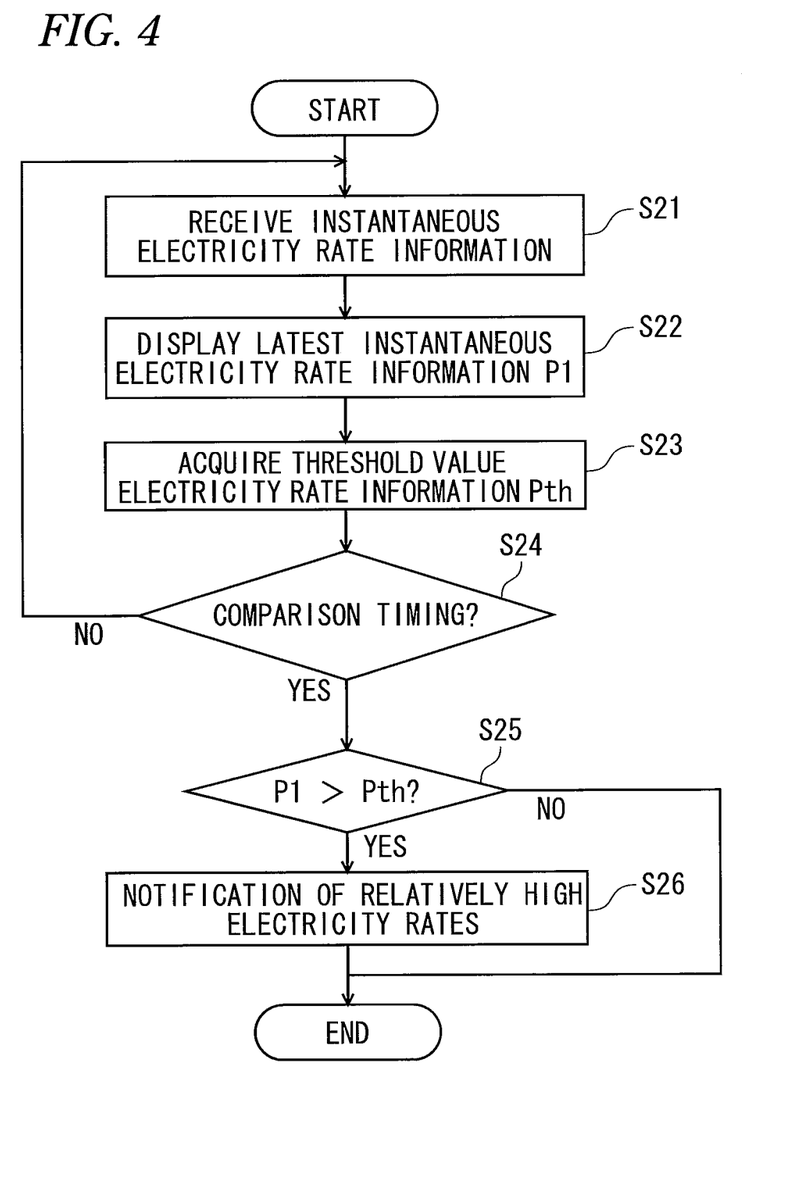
FIG. 4 is a flowchart showing a modification 2 of the operation in FIG. 2.

FIG. 4 shows one modification of operation of the household electrical appliance 10. In this modification 2, threshold value electricity rate information Pth corresponding to the above-described reference electricity rate information Pref is determined as an arbitrary value by the input operation of the consumer. The household electrical appliance 10 is provided with an input unit (not shown) to receive the input operation of the consumer. The input unit includes buttons which can be operated by the consumer and the like.

Like the operation shown in FIG. 2, the receiving unit 11 regularly or irregularly receives the latest instantaneous electricity rate information from the smart meter 20 in step S21 in FIG. 4. In step S22, the numerical value display unit 13 displays the contents of the latest instantaneous electricity rate information P1 received by the receiving unit 11 with the numerical value such as "30 yen/kWh".

In step S23, a value input from the input unit according to the input operation of the consumer is acquired and stored as the threshold value electricity rate information Pth by the determination unit 14.

In step S24, the determination unit 14 identifies whether the current time is predetermined comparison timing or not. For example, in the case of performing the comparison every one minute, the process proceeds to step S25 whenever one minute elapses. When step S24 is omitted and the threshold value electricity rate information Pth is input by the input unit, processes after step S25 may be performed.

In step S25, the determination unit 14 compares the latest instantaneous electricity rate information P1 with the threshold value electricity rate information Pth. When the condition that the latest instantaneous electricity rate information is bigger than the threshold value electricity rate information Pth (P1>Pth) is satisfied, the process proceeds to step S26.

In step S26, to clarify that the electricity rates of power consumption in consuming are relatively high, the determination unit 14 outputs predetermined control information to the numerical value display unit 13. Specifically, the numerical value display unit 13 can change the background color of the numerical value display according to the control information. For example, it is assumed that the red background color is determined at the time of high electricity rates and the blue background color is determined at the time of low electricity rates. In a similar manner to step S18 in FIG. 2, the notification may be performed in methods other than changing the background color.

Meanwhile, when the instantaneous electricity rate information P1 is equal to or smaller than the threshold value electricity rate information Pth, the determination unit 14 clears the control information to clarify that the electricity rates of power consumption in consuming are relatively low. Due to this, for example, the background color of the numerical value display in the numerical value display unit 13 is reset to the usual color (for example, blue) and the LED lamp showing that the electricity rates are high is extinguished to release the output of warning sound.

In this embodiment, the determination unit 14 may calculate the reference electricity rate information Pref using the following method. For example, the determination unit 14 may regularly accumulate a day's worth of all of the instantaneous electricity rate information P1 of, add the information of a day's worth, divide the information by the addition counts and calculate the reference electricity rate information Pref. The reference electricity rate information Pref may be calculated by accumulating the sum obtained by regularly adding the instantaneous electricity rate information P1 and only the information of number of additions, and dividing the added sum by the number of additions at the time of calculating an average electricity rate.

Modification 3

In this embodiment, when the instantaneous electricity rate information P1 is bigger than the reference electricity rate information Pref (P1>Pref), the background color of the numerical value display on the numerical value display unit 13 is red and when the instantaneous electricity rate information P1 is smaller than the reference electricity rate information Pref, the background color of the numerical value display on the numerical value display unit 13 is blue so that the user of the household electrical appliance can recognize whether the present power rates are high or not. However, when the instantaneous electricity rate information P1 is close to the reference electricity rate information Pref, the background color is frequently changed to red and blue.

In modification 3, when the instantaneous electricity rate information P1 is bigger than the reference electricity rate information Pref and when a variation amount of instantaneous electricity rate information received just before the instantaneous electricity rate information P1 is received and the reference electricity rate information is higher than a predetermined value, the background color becomes red.

Moreover, when the instantaneous electricity rate information P1 is smaller than the reference electricity rate information Pref and when the variation amount of instantaneous electricity rate information received just before the instantaneous electricity rate information P1 is received and the reference electricity rate information is lower than a predetermined value, the background color becomes blue. In cases other than above two conditions, the background color is not displayed with color.

According to this, changing the background color to red and blue frequently according to the instantaneous electricity rates is avoidable.

INDUSTRIAL APPLICABILITY

While the present invention has been described in detail, or with reference to the specific embodiments, it is apparent for those skilled in the art that the invention may be modified and changed in various manners without departing from the scope and spirit of the invention.

The present application is based on Japanese Patent Application No. 2009-295146 filed on Dec. 25, 2009, the entire content of which is incorporated by reference herein.

As described above, the invention is useful for a device such as an air conditioner, a microwave oven, a washing machine, and a vacuum cleaner that a consumer can put into an operating state by turning a power switch ON or OFF, if necessary, a device in which the power consumption amount change remarkably according to a preset temperature, a device in which an energy-saving mode is loaded and the power consumption amount change remarkably by turning the mode ON or OFF, and the like. Thus, by clearly showing a consumer whether the present electricity rates are relatively high or not, the consumer does not need to pay for high electricity rates and can contribute to reducing the discharge of carbon dioxide.

The invention claimed is:

1. A household electrical appliance, comprising:
an instantaneous electricity rate information receiving unit that receives information of electricity rates which are changed based on power generation capacity and power consumption amount and charged for power consumption as instantaneous electricity rate information;
an instantaneous electricity rate information accumulating unit that accumulates the instantaneous electricity rate information received by the instantaneous electricity rate information receiving unit;
a reference electricity rate information calculating unit that outputs a result obtained by statistically calculating a plurality of the instantaneous electricity rate information items accumulated by the instantaneous electricity rate information accumulating unit as reference electricity rate information;
an electricity rate comparing unit that compares the latest instantaneous electricity rate information received by the instantaneous electricity rate information receiving unit with the reference electricity rate information output from the reference electricity rate information calculating unit; and
a notification unit that notifies whether the latest instantaneous electricity rate information is higher than the reference electricity rate information, in accordance with the comparison result of the electricity rate comparing unit.

2. The household electrical appliance according to claim 1, wherein the reference electricity rate information calculating unit calculates mean of the plurality of instantaneous electricity rate information items received during a predetermined period in the past as the reference electricity rate information.

3. The household electrical appliance according to claim 2, wherein the reference electricity rate information calculating unit calculates the mean of the plurality of the instantaneous electricity rate information received previous day as the reference electricity rate information.

4. The household electrical appliance according to claim 2, wherein the reference electricity rate information calculating unit calculates the mean of the plurality of instantaneous electricity rate information items received within the last 24 hours as the reference electricity rate information.

5. The household electrical appliance according to claim 1, wherein the notification unit lights up an LED lamp for notification.

6. The household electrical appliance according to claim 1, wherein the notification unit displays the instantaneous electricity rate information and changes a background color of the instantaneous electricity rate information for notification.

7. The household electrical appliance according to claim 1, wherein the notification unit outputs warning sound for notification when the power is applied to the household electrical appliance.

8. A household electrical appliance, comprising:
an instantaneous electricity rate information receiving unit that receives information of electricity rates which are changed based on power generation capacity and power consumption amount and charged for power consumption as instantaneous electricity rate information;

an input unit to input information;

an electricity rate comparing unit that compares the instantaneous electricity rate information received by the instantaneous electricity rate information receiving unit with threshold value electricity rate information input from the input unit; and a notification unit that notifies whether the instantaneous electricity rate information is higher than the threshold value electricity rate information, in accordance with the comparison result of the electricity rate comparing unit.

9. The household electrical appliance according to claim 8, wherein the notification unit lights up an LED lamp for notification.

10. The household electrical appliance according to claim 8, wherein the notification unit displays the instantaneous electricity rate information and changes a background color of the instantaneous electricity rate information for notification.

11. The household electrical appliance according to claim 8, wherein the notification unit outputs warning sound for notification when the power is applied to the household electrical appliance.

\* \* \* \* \*